(12) United States Patent
Lee

(10) Patent No.: US 12,050,750 B2
(45) Date of Patent: Jul. 30, 2024

(54) TOUCH SENSING DEVICE

(71) Applicant: LX SEMICON CO., LTD., Daejeon (KR)

(72) Inventor: Young Eun Lee, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 18/072,025

(22) Filed: Nov. 30, 2022

(65) Prior Publication Data

US 2023/0205363 A1     Jun. 29, 2023

(30) Foreign Application Priority Data

Dec. 28, 2021    (KR) .................. 10-2021-0189392

(51) Int. Cl.
    *G06F 3/041*       (2006.01)
    *G06F 3/044*       (2006.01)

(52) U.S. Cl.
    CPC ...... *G06F 3/0418* (2013.01); *G06F 3/041662* (2019.05); *G06F 3/0446* (2019.05)

(58) Field of Classification Search
    CPC ............. G06F 3/0418; G06F 3/041662; G06F 3/0446; G06F 3/041; G06F 3/044
    See application file for complete search history.

(56) References Cited

U.S. PATENT DOCUMENTS

| | | | |
|---|---|---|---|
| 2013/0154965 A1* | 6/2013 | Hwang ................. | G06F 3/0446 345/173 |
| 2014/0168141 A1 | 6/2014 | Sasselli et al. | |
| 2014/0204058 A1* | 7/2014 | Huang .................. | G06F 3/0446 345/174 |
| 2016/0259472 A1* | 9/2016 | Ledet .................... | G06F 3/0414 |
| 2017/0068389 A1* | 3/2017 | Tomokiyo ........... | G06F 3/04166 |
| 2020/0012382 A1* | 1/2020 | Lee ....................... | G06F 3/04186 |
| 2022/0027012 A1* | 1/2022 | Kim ...................... | G06F 3/0412 |
| 2022/0066614 A1* | 3/2022 | Shirley ................. | G06F 3/0446 |

FOREIGN PATENT DOCUMENTS

KR     10-2020-0027328 A     3/2020

\* cited by examiner

*Primary Examiner* — Md Saiful A Siddiqui
(74) *Attorney, Agent, or Firm* — Greenberg Traurig, LLP

(57) ABSTRACT

A touch sensing device configured to drive a plurality of touch sensors according to one embodiment of the present disclosure includes a controller configured to calculate an area of a touch region, intensity of touch sensitivity, and uniformity of the touch sensitivity, and classify whether a touch situation is a normal touch situation or an abnormal touch situation based on the area of the touch region, and the intensity of the touch sensitivity, and the uniformity of the touch sensitivity using sensing signals input from the plurality of touch sensors.

10 Claims, 13 Drawing Sheets

| | | | | | | | coin | | | | | | | | |
|---|---|---|---|---|---|---|---|---|---|---|---|---|---|---|---|
| | | | | | | | | | | | | 2 | | | |
| | | | | | | | | | | | | | | | 2 |
| | | | | 2 | | | | | | | | | | | |
| | | | | | | | | | | | | | | | |
| | | | | | | | | | | | | | | | |
| 5 | | | | | | | | | | | | | -7 | -8 | |
| | | | | | | | | | | | | | | 2 | |
| | | | | | | | | | | | | | | | |
| | | | | | -11 | | 14 | | -4 | | | | | | |
| | | | | -30 | -96 | 43 | 78 | 64 | | 128 | | | | | |
| | | | | -24 | 93 | -45 | -83 | -75 | 37 | -26 | | | | | |
| | | | | 105 | 54 | -78 | 117 | 108 | -16 | 137 | | | | | |
| | | | | 106 | | -78 | 118 | 108 | | 157 | | | | | |
| | | | | -8 | 114 | -53 | -97 | -96 | 37 | 57 | | | | | |
| | | | | -45 | -43 | 80 | 62 | 54 | 51 | -139 | | | | | |
| | | | | -13 | -4 | 27 | | 2 | -11 | -19 | | | | | |
| | | | | -2 | -2 | | 5 | 3 | | -3 | | | | | |
| | | | | | | | | | | | | | | | |
| | | -2 | | | | | | | | | | | | | |
| | | | | | | | | | | | | | | | |
| | | | | | | | | | | | | | 2 | | |

TOUCH SENSING DEVICE

CROSS-REFERENCE TO RELATED APPLICATIONS

This application claims the benefit of the Korean Patent Applications No. 10-2021-0189392 filed on Dec. 28, 2021 which are hereby incorporated by reference as if fully set forth herein.

FIELD OF THE INVENTION

The present specification relates to a touch sensing device and a touch display driving device including the same.

BACKGROUND

A liquid crystal display (LCD) using liquid crystals, an organic light-emitting diode (OLED) display using an organic light-emitting diode, and the like are representative display devices which display an image.

Recently, a display device including a touch screen panel capable of sensing a touch input by a user's finger or a stylus pen, breaking away from usual input manners such as a button, a keyboard, a mouse, and the like (hereinafter referred to as "a touch display device") has been widely used. The above-described touch display device includes a touch sensing device.

That is, the touch display device can include a display driving device which drives the display device and a touch sensing device which detects presence and absence of a touch and touch coordinates (or a touch position). Specifically, the touch sensing device detects touch sensing data by driving touch sensors (or touch electrodes), and detects touch information including the presence and absence of the touch or touch coordinates using the detected touch sensing data.

SUMMARY

The present disclosure is directed to providing a touch sensing device which prevents a malfunction of a touch display panel and a touch display driving device including the same.

A touch sensing device configured to drive a plurality of touch sensors according to one embodiment of the present disclosure includes a controller configured to calculate an area of a touch region, intensity of touch sensitivity and, uniformity of the touch sensitivity using sensing signals input from the plurality of touch sensors, and classify whether a touch situation is a normal touch situation or an abnormal touch situation based on the area of the touch region, and the intensity of the touch sensitivity, and the uniformity of the touch sensitivity.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 6A and 6B are views illustrating a result of signals input when a touch is discriminated as a normal touch;

FIGS. 7A, 7B and 7C are views illustrating a result of signals input when a touch is discriminated as an abnormal touch;

DETAILED DESCRIPTION OF THE DISCLOSURE

Figure 1:
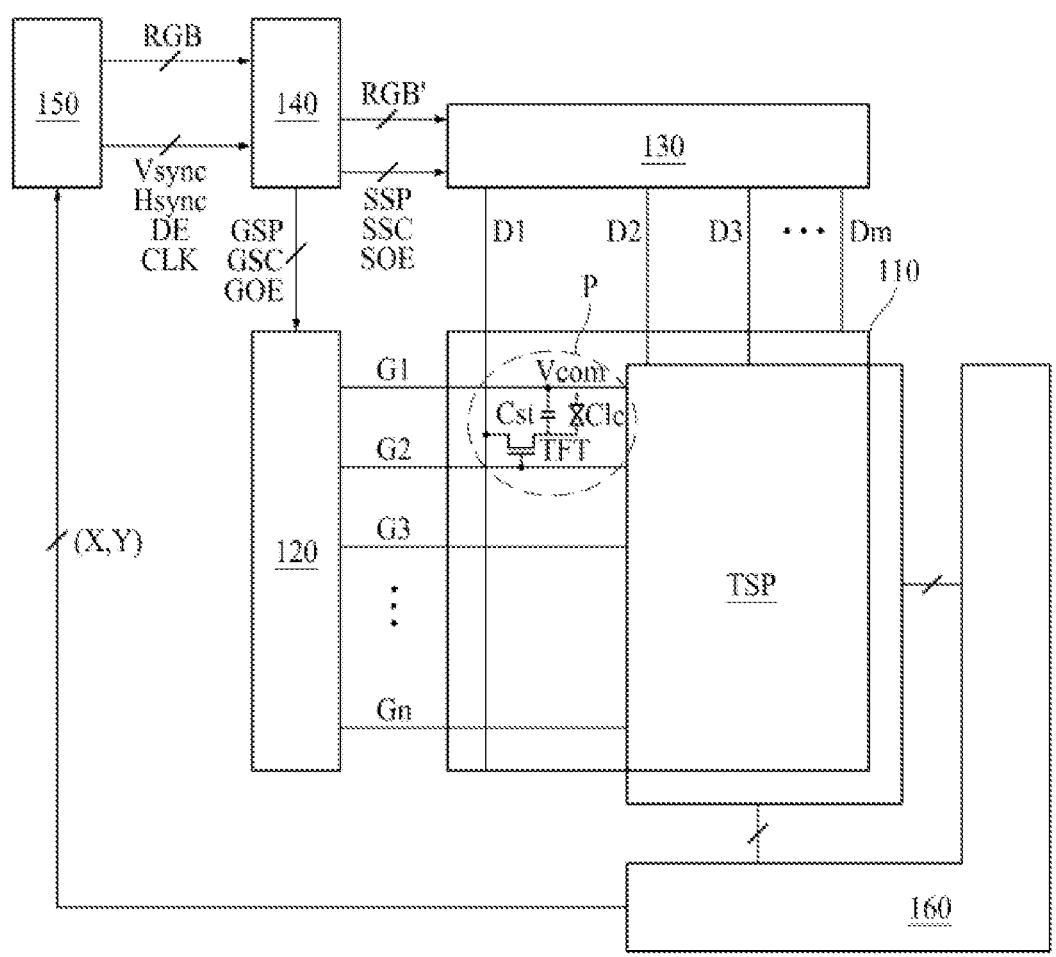
FIG. 1 is a view illustrating a touch display device to which a touch sensing device according to one embodiment of the present disclosure is applied.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present specification will be described in detail with reference to the accompanying drawings.

FIG. 1 is a view illustrating a touch display device to which a touch sensing device according to one embodiment of the present disclosure is applied.

As shown in FIG. 1, a touch display device 100 includes a display panel 110, a touch screen panel TSP, and a touch display driving device, and the touch display driving device includes a gate driver 120, a data driver 130, a timing controller 140, a host system 150, and a touch sensing device 160.

The display panel 110 includes a plurality of gate lines G1 to Gn and a plurality of data lines D1 to Dm that are arranged to intersect each other to define a plurality of pixel regions, and a pixel P provided in each of the plurality of pixel regions. The plurality of gate lines G1 to Gn may extend in a lateral direction and the plurality of data lines D1 to Dm may extend in a longitudinal direction, but the present disclosure is not limited thereto.

In one embodiment, the display panel 110 may be a liquid crystal display (LCD) panel. When the display panel 110 is the liquid crystal display panel, the display panel 110 includes thin film transistors TFT formed in the pixel regions defined by the plurality of gate lines G1 to Gn and the plurality of data lines D1 to Dm, and liquid crystal cells connected to the thin film transistors TFT.

The thin film transistors TFT supply source signals supplied through the data lines D1 to Dm to the liquid crystal cells in response to scan pulses supplied through the gate lines G1 to Gn.

The liquid crystal cell is composed of a common electrode and a sub-pixel electrode connected to the thin film transistor TFT facing each other with a liquid crystal interposed therebetween, and thus may be equivalently displayed as a liquid crystal capacitor Clc. The liquid crystal cell includes a storage capacitor Cst connected to a previous stage gate line to maintain a voltage corresponding to the source signal charged in the liquid crystal capacitor Clc until a voltage corresponding to a next source signal is charged.

Meanwhile, the pixel region of the display panel 110 may include red (R), green (G), blue (B), and white (W) sub-pixels. In one embodiment, the sub-pixels may be repeatedly formed in a row direction or formed in a 2*2 matrix form. In this case, a color filter corresponding to each color is disposed in each of the red (R), green (G), and blue (B) sub-pixels, but a color filter is not separately disposed in the white (W) sub-pixel. In one embodiment, the red (R), green (G), blue (B), and white (W) sub-pixels may be formed to have the same area ratio, but the red (R), green (G), blue (B), and white (W) sub-pixels may also be formed to have different area ratios.

In the above-described embodiment, it is described that the display panel 110 is the liquid crystal display panel, but in another embodiment, the display panel 110 may be an organic light-emitting display (OLED) panel.

The gate driver 120 includes a shift register which sequentially generates scan pulses, that is, gate high pulses, according to a gate control signal GCS from the timing controller 140. The thin film transistors TFT are turned on in response to these scan pulses.

As shown in the drawings, the gate driver 120 may be disposed at one side, for example, a left side of the display panel 110, but in some cases it may be disposed at one side and the other side facing each other, for example, both left and right sides of the display panel 110. The gate driver 120 may include a plurality of gate driver integrated circuits (ICs, not shown). The gate driver 120 may be formed in the form of a tape carrier package in which the gate drivers IC are mounted, but the present disclosure is not limited thereto, and the gate drivers IC may be directly mounted on the display panel 110.

The data driver 130 converts a digital image signal RGB' transmitted from the timing controller 140 to an analog source signal and outputs the analog source signal to the display panel 110. Specifically, the data driver 130 outputs the analog source signal to the data lines D1 to Dm in response to a data control signal DCS transmitted from the timing controller 140.

The data driver 130 may be disposed at one side of the display panel 110, for example, at an upper side of the display panel 110, but it may be disposed at one side and the other side of the display panel 110 facing each other, for example, at both upper and lower sides of the display panel 110 in some cases. Further, the data driver 130 may be formed in the form of a tape carrier package in which source drivers IC are mounted, but the present disclosure is not limited thereto.

In one embodiment, the data driver 130 may include a plurality of source driver ICs (not shown) which convert a digital image signal transmitted from the timing controller 140 to an analog source signal and output the analog source signal to the display panel 110.

The timing controller 140 receives various timing signals including a vertical synchronization signal Vsync, a horizontal synchronization signal Hsync, a data enable (DE) signal, a clock signal CLK, and the like from the host system 150 to generate the data control signal DCS for controlling the data driver 130 and the gate control signal GCS for controlling the gate driver 120. Further, the timing controller 140 receives an image signal RGB from the host system 150, converts the image signal RGB to an image signal RGB' in a form which may be processed by the data driver 130, and outputs the image signal RGB'.

In one embodiment, the data control signal DCS may include a source start pulse SSP, a source sampling clock SSC, a source output enable signal SOE, and the like, and the gate control signal GCS may include a gate start pulse GSP, a gate shift clock GSC, a gate output enable signal GOE, and the like.

Here, the source start pulse controls a data sampling start timing of the plurality of source driver ICs (not shown) constituting the data driver 130. The source sampling clock is a clock signal which controls a sampling timing of data in each source driver IC. The source output enable signal controls an output timing of each source driver IC.

The gate start pulse controls an operation start timing of the plurality of gate driver ICs (not shown) constituting the gate driver 120. The gate shift clock is a clock signal commonly input to one or more gate driver ICs, and controls a shift timing of a scan signal (gate pulse). The gate output enable signal designates timing information of one or more gate driver ICs.

The host system 150 may be implemented as any one of a navigation system, a set-top box, a digital versatile disk (DVD) player, a Blu-ray player, a personal computer (PC), a home theater system, a broadcast receiver, and a phone system. The host system 150 includes a system on chip (SoC) having a built-in scaler to convert the digital image signal RGB of an input image to a format suitable to be displayed on the display panel 110. The host system 150 transmits the digital image signal RGB and timing signals to the timing controller 140. Further, the host system 150 analyzes touch coordinates (X, Y) input from the touch sensing device 160 to cause the touch coordinates to be output in a line form on the display panel 110 or execute an application program linked with coordinates where a touch caused by a user occurs.

A touch is input to the touch screen panel TSP by the user, and the touch screen panel TSP may be implemented in a form built in the display panel 110. For example, the touch screen panel TSP may be disposed on the display panel 110 in an on-cell type or in an in-cell type. That is, the touch screen panel TSP may include a plurality of touch sensors disposed in the on-cell type or the in-cell type. However, the present disclosure is not limited thereto, and the touch screen panel TSP may be implemented separately from the display panel 110.

The touch sensing device 160 senses a touch which occurs on the touch screen panel TSP through the touch sensors. The touch sensing device 160 may calculate presence and absence of the touch and touch coordinates by driving the touch screen panel TSP according to a mutual capacitance method and a self-capacitance method.

Hereinafter, the touch sensing device according to one embodiment of the present disclosure will be described with reference to FIGS. 2 to 9B.

Figure 2:
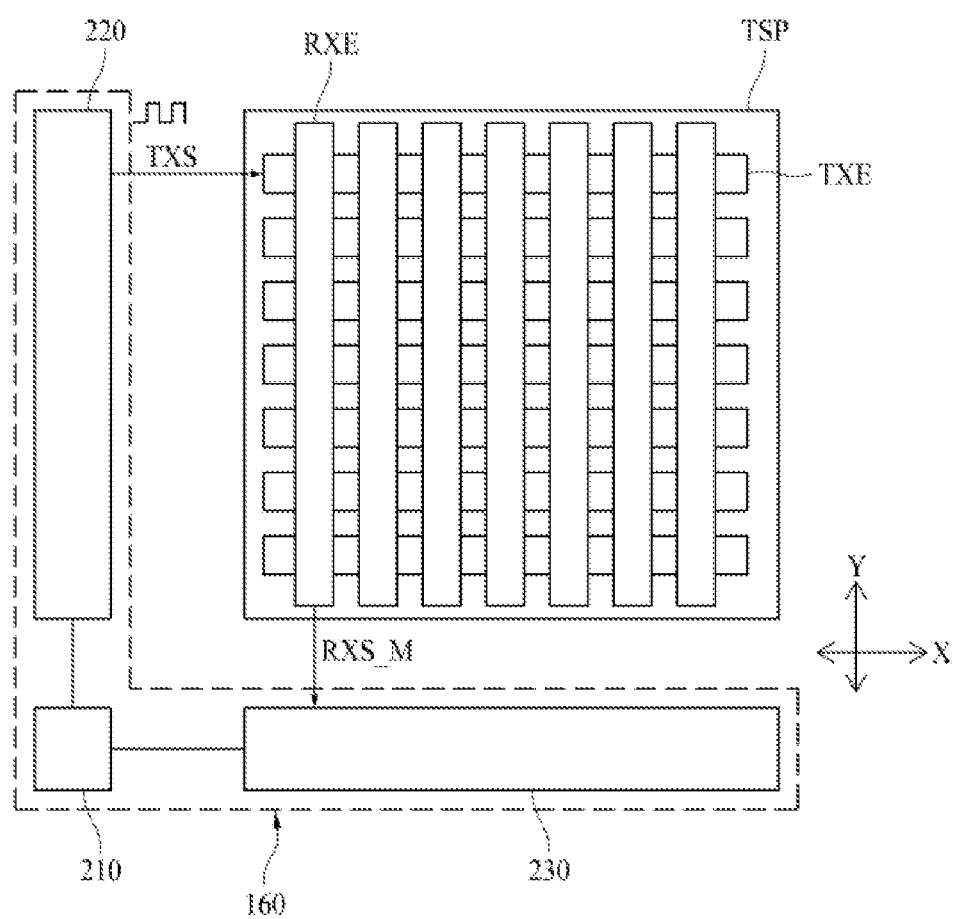
FIG. 2 is a view illustrating a signal transmitted and received between a touch sensing device and a touch screen panel according to a mutual capacitance method.
Figure 3:
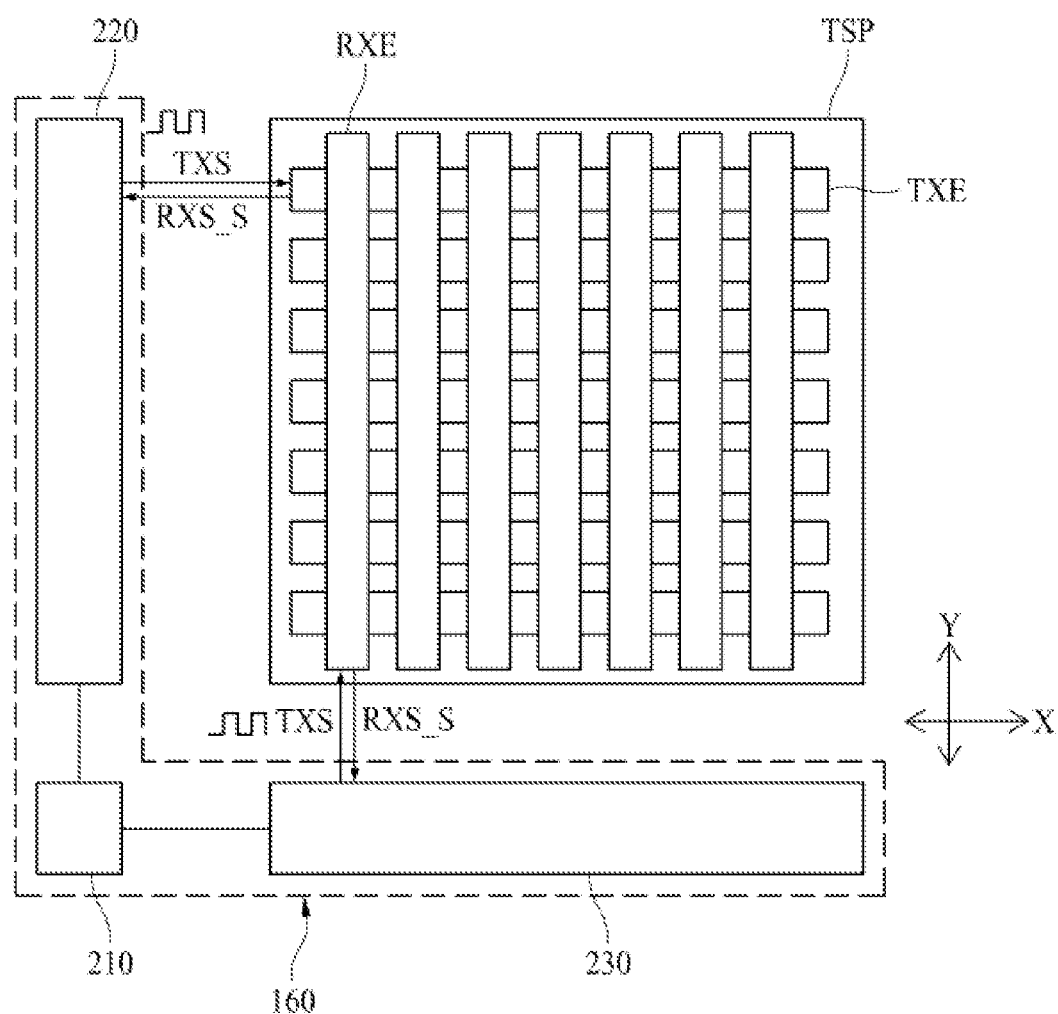
FIG. 3 is a view illustrating a signal transmitted and received between a touch sensing device and a touch screen panel according to a self-capacitance method.
Figure 4:
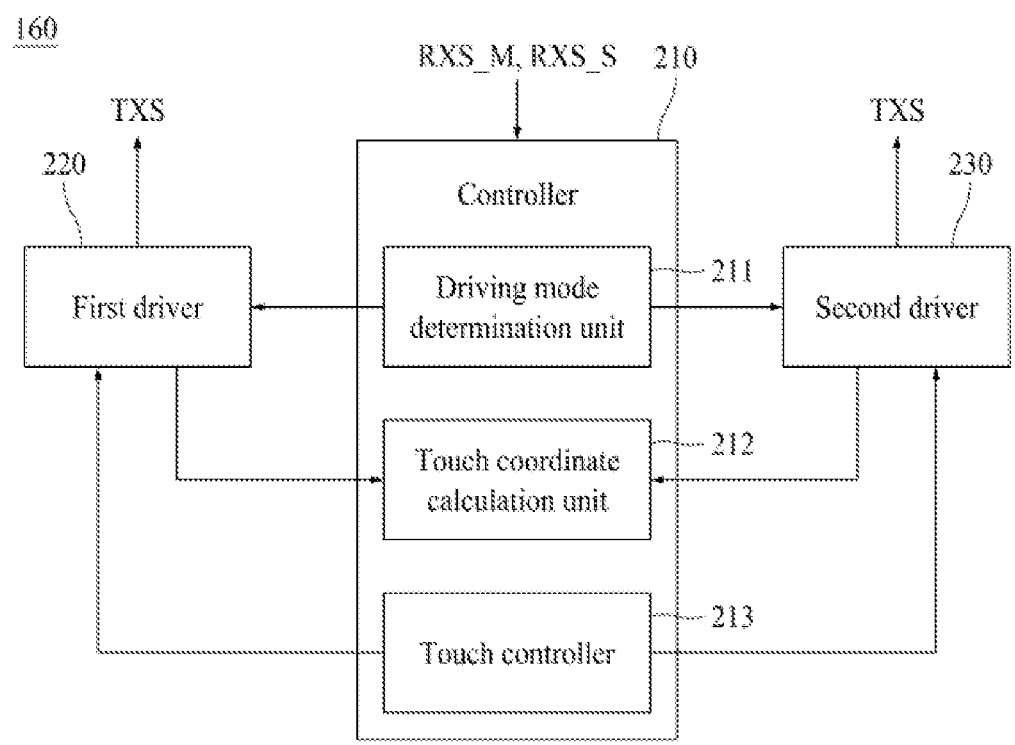
FIG. 4 is a block diagram schematically illustrating a configuration of the touch sensing device shown in FIGS. 1 to 3.
Figure 5:
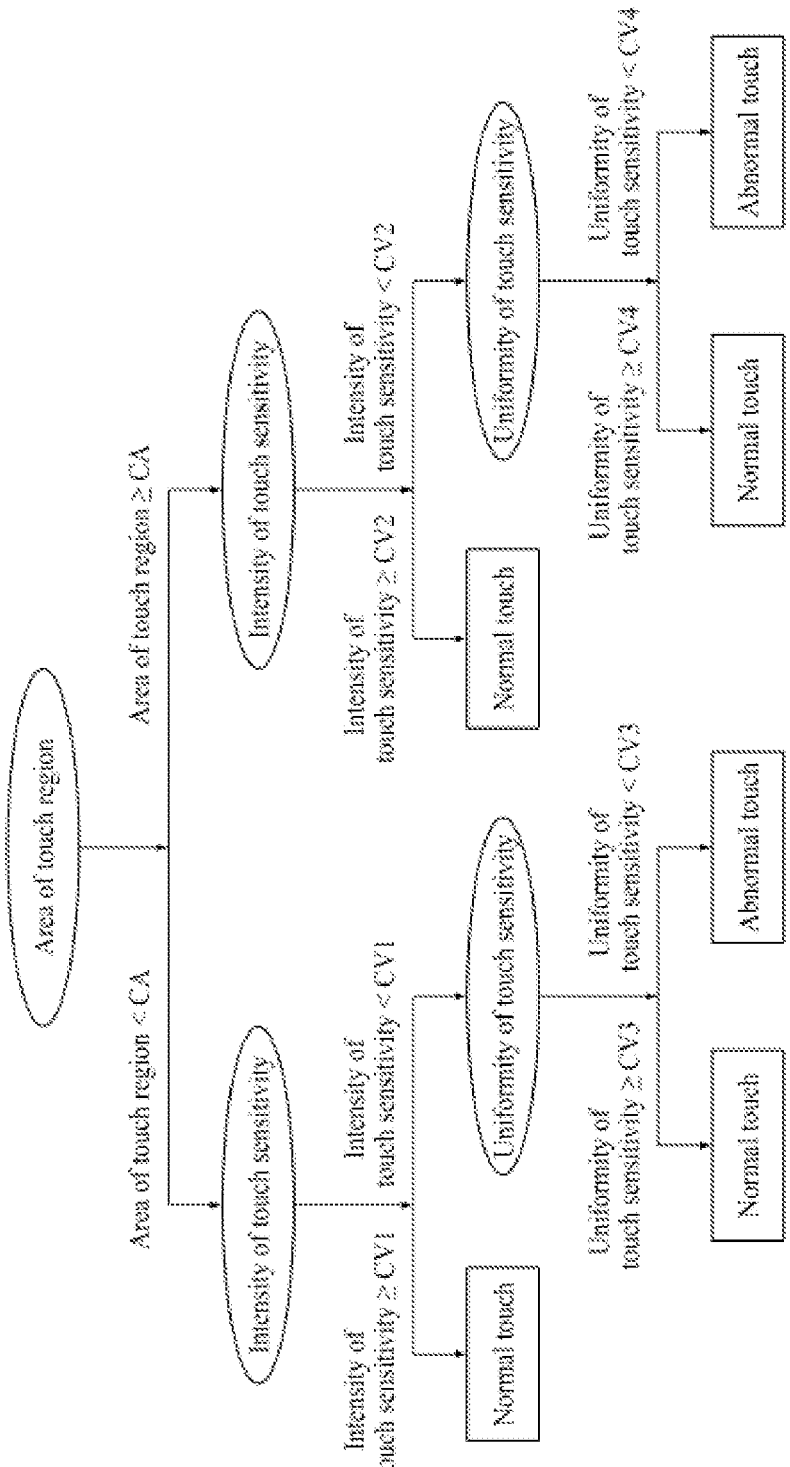
FIG. 5 is a view illustrating a decision tree of a learning model according to one embodiment of the present disclosure.
Figure 6A:
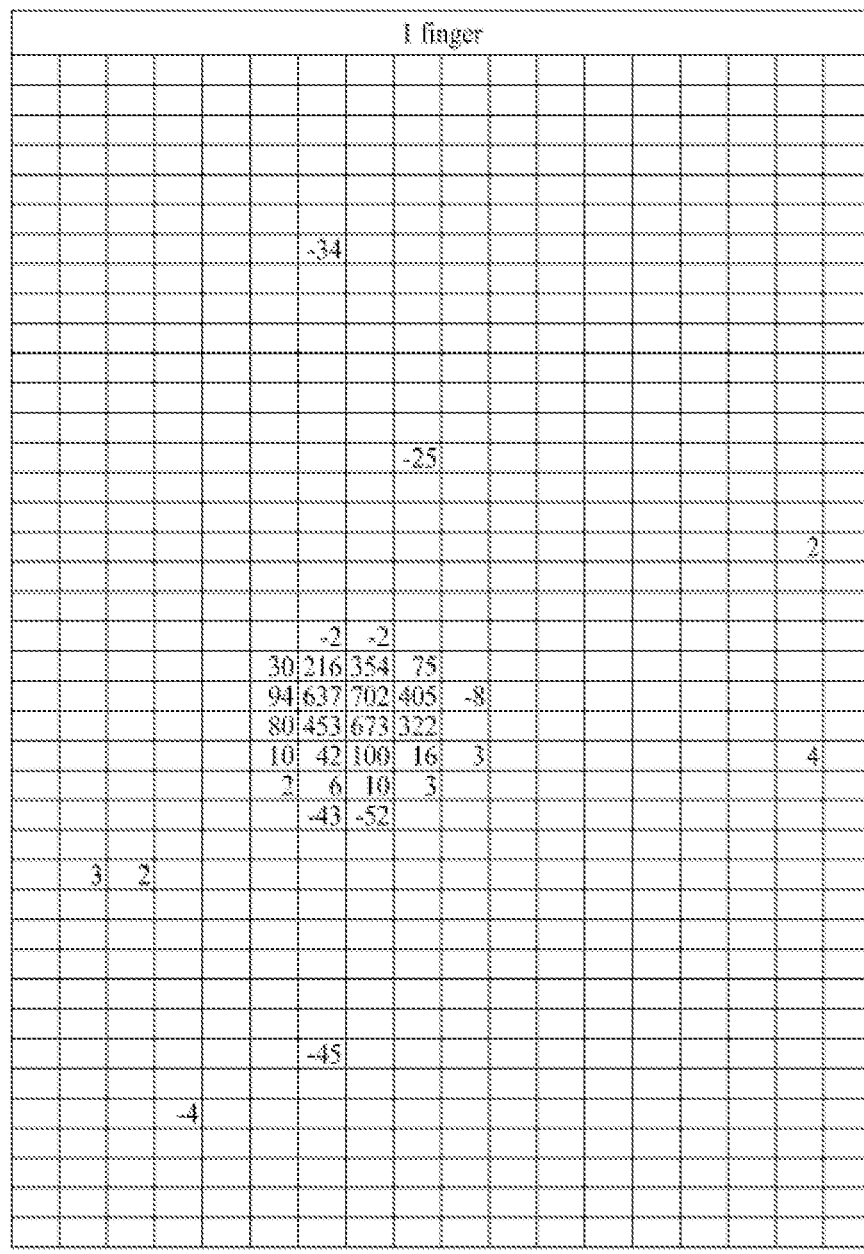
Figure 6B:
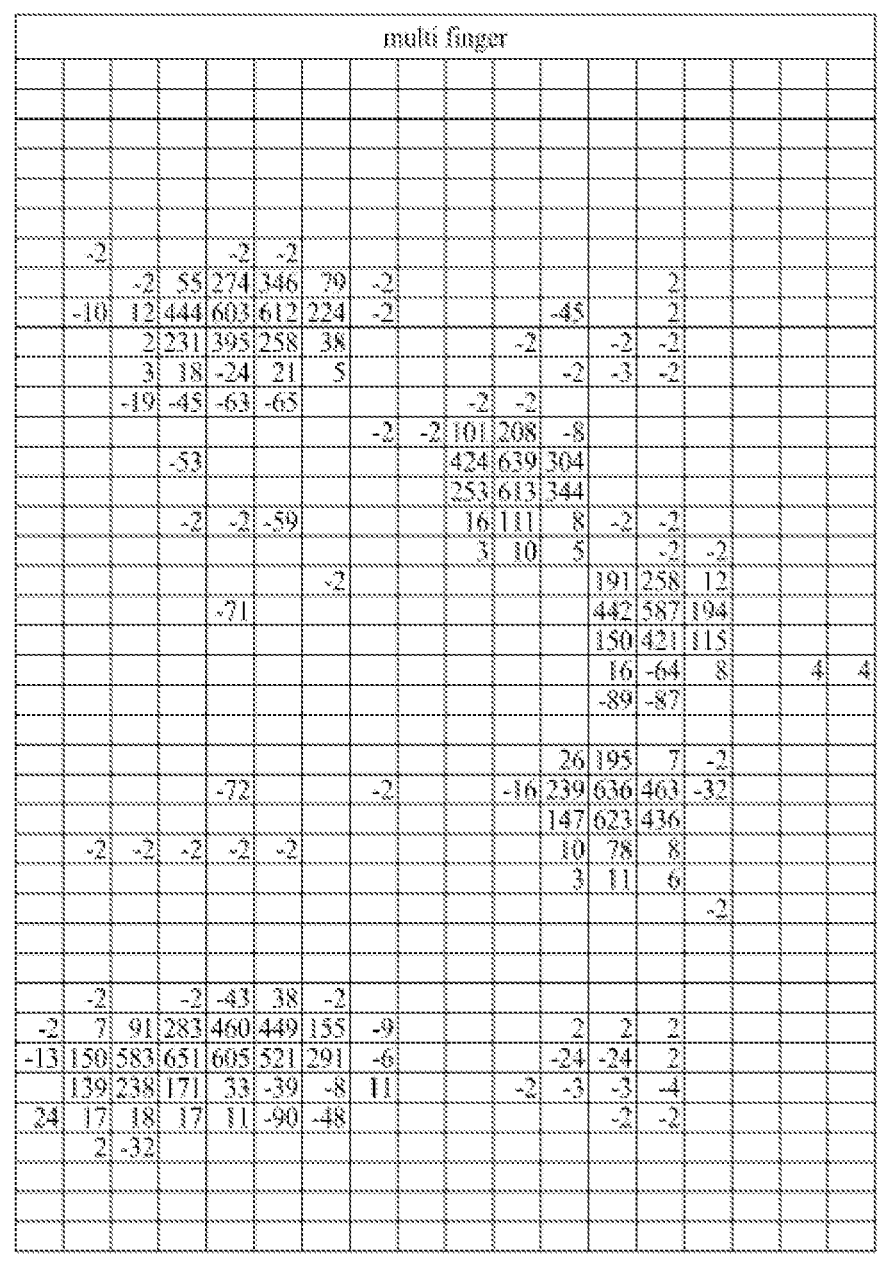
Figure 7A:
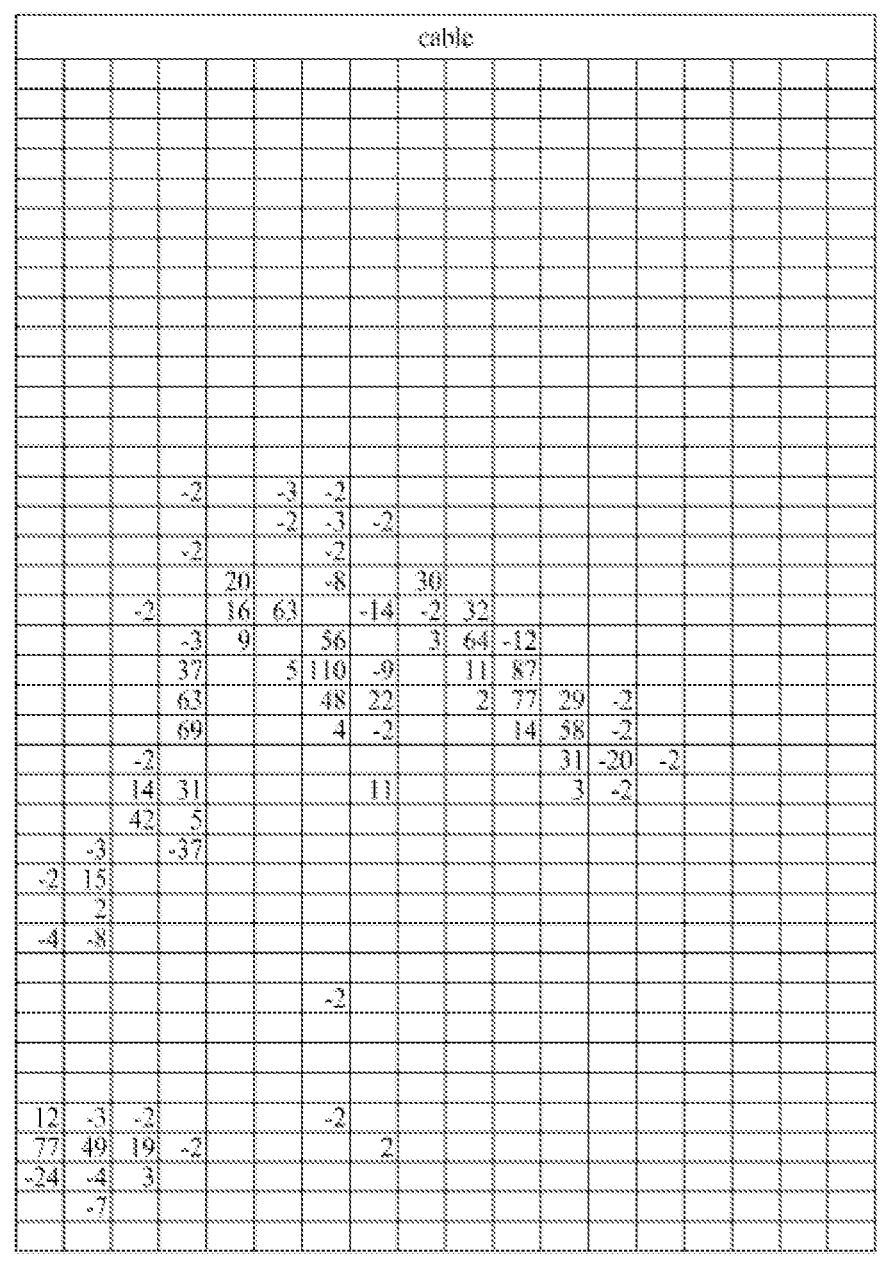
Figure 7B:
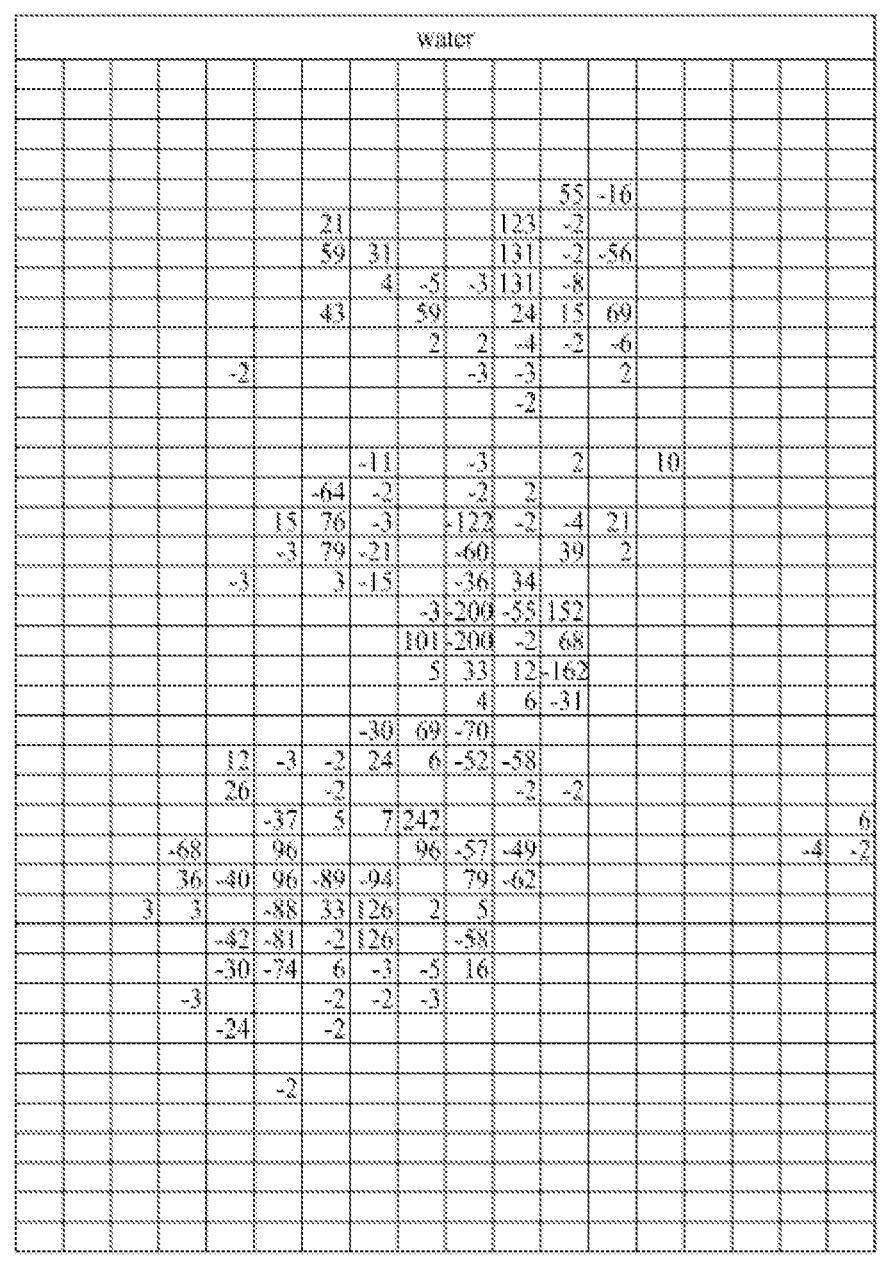
Figure 8:
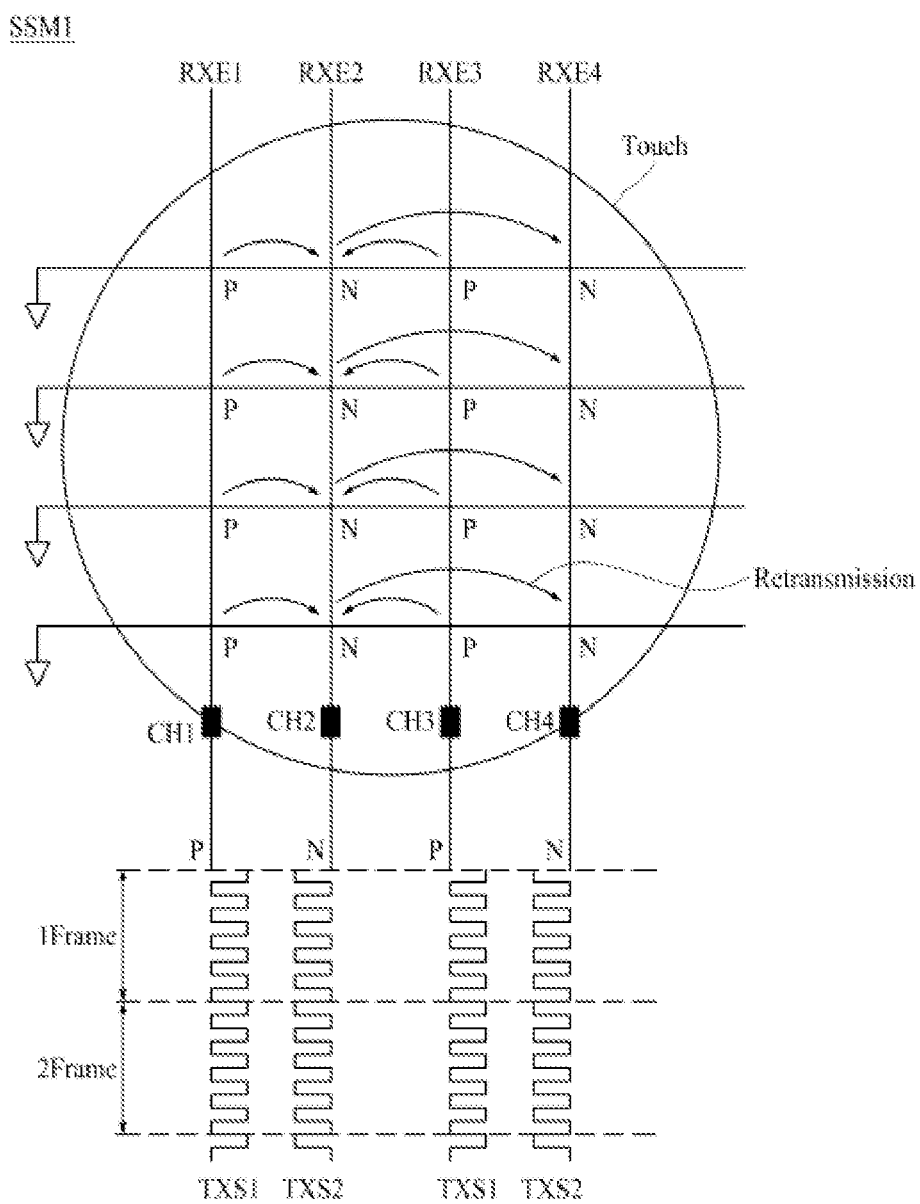
FIG. 8 is a view illustrating a first driving signal and a second driving signal transmitted in a first self-sensing mode according to one embodiment of the present disclosure.
Figure 9A:
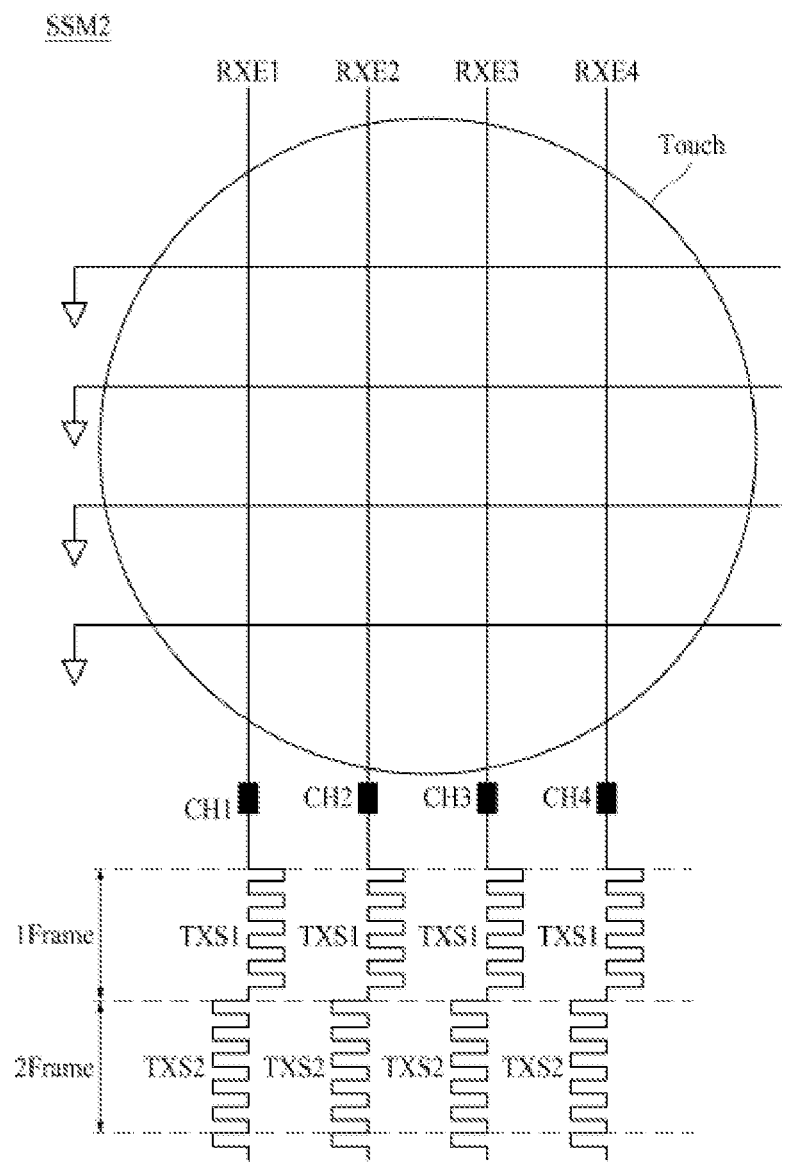
FIGS. 9A and 9B are views illustrating a first driving signal and a second driving signal transmitted in a second self-sensing mode according to one embodiment of the present disclosure.
Figure 9B:
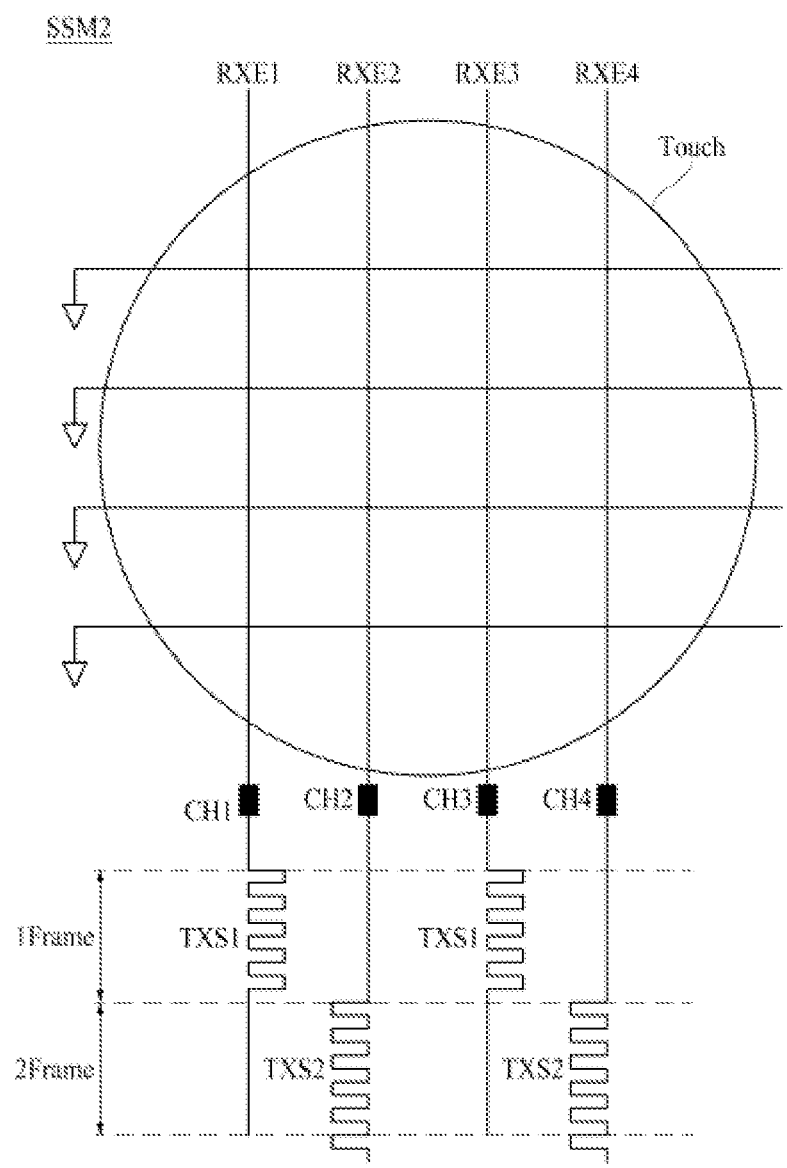

FIG. 2 is a view illustrating a signal transmitted and received between the touch sensing device and the touch screen panel according to a mutual capacitance method. FIG. 3 is a view illustrating a signal transmitted and received between the touch sensing device and the touch screen panel according to a self-capacitance method. FIG. 4 is a block diagram schematically illustrating a configuration of the touch sensing device shown in FIGS. 1 to 3. FIG. 5 is a view illustrating a decision tree of a learning model according to one embodiment of the present disclosure. FIGS. 6A and 6B are views illustrating a result of signals input when a touch is discriminated as a normal touch. FIGS. 7A to 7C are views illustrating a result of signals input when a touch is discriminated as an abnormal touch. FIG. 8 is a view illustrating a first driving signal and a second driving signal transmitted in a first self-sensing mode according to one embodiment of the present disclosure. FIGS. 9A and 9B are views illustrating a first driving signal and a second driving signal transmitted in a second self-sensing mode according to one embodiment of the present disclosure.

As shown in FIGS. 2 and 3, the touch screen panel TSP may include touch driving electrodes TXE extending in a first direction X and touch sensing electrodes RXE extending in a second direction Y perpendicular to the first direction X. In this case, the plurality of touch driving electrodes TXE and touch sensing electrodes RXE may be disposed to cross and overlap each other.

The touch sensing device 160 receives the touch which occurs on the touch screen panel TSP. The touch sensing device 160 may be driven according to the mutual capacitance method and the self-capacitance method to calculate touch coordinates. Specifically, as shown in FIG. 2, the touch sensing device 160 may be driven in a mutual sensing mode (MSM) according to the mutual capacitance method to supply touch driving signals TXS to the touch driving electrodes TXE, and may receive a mutual sensing signal RXS_M from the touch sensing electrodes RXE coupled to the touch driving electrodes TXE. Further, as shown in FIG. 3, the touch sensing device 160 may be driven in a first self-sensing mode (SSM1) or a second self-sensing mode (SSM2) according to the self-capacitance method to supply the driving signal TXS to the touch driving electrodes TXE and the touch sensing electrodes RXE, and receive a self-sensing signal RXS_S for each of the supplied driving signals TXS.

According to one embodiment of the present disclosure, the touch sensing device 160 may be driven using different driving modes according to touch situations. Specifically, in the case of a normal touch situation, the touch sensing device 160 may be driven in the mutual sensing mode (MSM) and the first self-sensing mode (SSM1), and in the case of an abnormal touch situation, the touch sensing device 160 may be driven in the mutual sensing mode (MSM) and the second self-sensing mode (SSM2).

The touch sensing device 160 may calculate the touch coordinates (X, Y) using at least one among the mutual sensing signal RXS_M input by the mutual sensing mode (MSM), a first self-sensing signal RXS_S1 input by the first self-sensing mode (SSM1), and a second self-sensing signal RXS_S2 input by the second self-sensing mode (SSM2).

The touch sensing device 160 includes a controller 210, a first driver 220, and a second driver 230.

The controller 210 calculates the touch coordinates using the mutual sensing signal RXS_M and the self-sensing signal RXS_S input to the first driver 220 and the second driver 230. The controller 210 discriminates the touch situation using at least one among the self-sensing signal RXS_S input to the first and second drivers 220 and 230 and the mutual sensing signal RXS_M input to the second driver 230, and determines driving modes of the first driver 220 and the second driver 230 according to the discriminated touch situation. To this end, the controller 210 includes a driving mode determination unit 211, a touch coordinate calculation unit 212, and a touch controller 213.

The driving mode determination unit 211 discriminates whether the touch situation is a normal touch situation caused by the user or an abnormal touch situation caused by a cause not intended by the user such as water or a coin using at least one among the self-sensing signal RXS_S input to the first and second drivers 220 and 230 and the mutual sensing signal RXS_M input to the second driver 230.

According to one embodiment of the present disclosure, the driving mode determination unit 211 includes a touch discrimination model learned using at least one among the self-sensing signal RXS_S input to the first and second drivers 220 and 230 and the mutual sensing signal RXS_M input to the second driver 230.

According to one embodiment of the present disclosure, the touch discrimination model is a learning model of a decision tree structure, which is a type of decision making support tool in which a decision-making rule and a result thereof are schematized in a tree structure, and classifies whether the touch situation is a normal touch situation or an abnormal touch situation for the sensing signals. Specifically, the touch discrimination model classifies whether the touch situation is a normal touch situation or an abnormal touch situation for the sensing signal based on at least one of an area of a touch region, intensity of touch sensitivity, and uniformity of the touch sensitivity. Specifically, the touch discrimination model discriminates the touch situation based on at least one of the area of the touch region, the intensity of the touch sensitivity, and the uniformity of the touch sensitivity for at least one among the self-sensing signal RXS_S input to the first and second drivers 220 and 230 and the mutual sensing signal RXS_M input to the second driver 230. To this end, the touch discrimination model is learned to classify whether the touch situation is a normal touch situation or an abnormal touch situation for a plurality of sensing signals based on at least one of the area of the touch region, the intensity of the touch sensitivity, and the uniformity of the touch sensitivity. Specifically, the touch discrimination model may calculate a threshold area CA which becomes a reference of the area of the touch region, a first threshold value CV1 and a second threshold value CV2 which become references of the intensity of the touch sensitivity, and a third threshold value CV3 and a fourth threshold value CV4 which become references of the uniformity of the touch sensitivity through the learning to discriminate whether the touch situation is a normal touch situation or an abnormal touch situation for the sensing signals with respect to the threshold area CA and the first to fourth threshold values CV1, CV2, CV3, and CV4.

The touch discrimination model is learned to classify the sensing signals according to the touch situation based on the area of the touch region. Specifically, the touch discrimination model may be learned to calculate the area of the touch region which is an area of the touch sensor to which the sensing signals are input to classify the calculated area of the touch region into a case of being larger or smaller than the threshold area CA calculated through the learning.

Then, the touch discrimination model is learned to classify the touch situation according to the sensing signals based on the intensity of the touch sensitivity. In this case, the intensity of the touch sensitivity may be calculated using a signal value of the sensing signal having a maximum value located in the touch region, the number of sensing signals greater than or equal to a specific signal value among sensing signals corresponding to the touch region, and an average signal value of the sensing signals greater than or equal to the specific signal value among the sensing signals corresponding to the touch region. However, the present disclosure is not limited thereto, and the intensity of the touch sensitivity may be calculated in various methods using the sensing signals.

The touch discrimination model may discriminate the touch situation by comparing the calculated intensity of the touch sensitivity with the first threshold value CV1 and the second threshold value CV2 calculated through the learning. Specifically, the touch discrimination model may discriminate the touch situation by comparing the intensity of the touch sensitivity for the sensing signals with the first threshold value CV1 when the area of the touch region is smaller than the threshold area CA, and may discriminate the touch situation by comparing the intensity of the touch sensitivity for the sensing signals with the second threshold value CV2 when the area of the touch region is larger than the threshold area CA. In this case, the first threshold value CV1 may have a different value from the second threshold value CV2, and may also have the same value as the second threshold value CV2.

When it is classified that the area of the touch region is smaller than the threshold area CA and the intensity of the touch sensitivity is greater than the first threshold value CV1 for the sensing signals, the touch discrimination model may be learned to discriminate that the touch situation is the normal touch situation for the sensing signals. For example, as shown in FIG. 6A, the touch discrimination model may be learned to discriminate that the touch situation is the normal touch situation for the sensing signals sensed when there is a touch with one finger. Further, as shown in FIG. 6B, the touch discrimination model may be learned to discriminate that the touch situation is the normal touch situation for at least some of the sensing signals sensed when there is a touch with a plurality of fingers.

When it is classified that the area of the touch region is greater than the threshold area CA and the intensity of the touch sensitivity is greater than the second threshold value CV2 for the sensing signals, the touch discrimination model may be learned to discriminate that the touch situation is the normal touch situation for the sensing signals. For example, as shown in FIG. 6B, the touch discrimination model may be learned to discriminate that the touch situation is the normal touch situation for at least some of the sensing signals sensed when there is a touch with a plurality of fingers.

When it is classified that the area of the touch region is smaller than the threshold area CA and the intensity of the touch sensitivity is smaller than the first threshold value CV1 for the sensing signals, the touch discrimination model is learned to discriminate the touch situation based on the uniformity of the touch sensitivity. In this case, the uniformity of the touch sensitivity may be calculated using a ratio of a + signal value and a − signal value of the sensing signal, the number of sensing signals having the + signal value, the number of sensing signals having the − signal value, a change rate of the sensing signal corresponding to the area of the touch region, a signal value of the sensing signal output from a touch sensor located adjacent to a touch sensor corresponding to the sensing signal having the maximum value, and the like. However, the present disclosure is not limited thereto, and the uniformity of the touch sensitivity may be calculated in various methods using the sensing signals.

The touch discrimination model may discriminate the touch situation by comparing the calculated intensity of the touch sensitivity with the third threshold value CV3 and the fourth threshold value CV4 calculated through the learning. Specifically, for the sensing signals, the touch discrimination model may discriminate the touch situation by comparing the uniformity of the touch sensitivity with the third threshold value CV3 when the area of the touch region is smaller than the threshold area CA and the intensity of the touch sensitivity is smaller than the first threshold value CV1, and may discriminate the touch situation by comparing the uniformity of the touch sensitivity with the fourth threshold value CV4 when the area of the touch region is larger than the threshold area CA and the intensity of the touch sensitivity is smaller than the second threshold value CV2. In this case, the first threshold value CV1 may have a different value from the second threshold value CV2, and may also have the same value as the second threshold value CV2.

When it is classified that the area of the touch region is smaller than the threshold area CA, the intensity of the touch sensitivity is smaller than the first threshold value CV1, and the touch uniformity is greater than the third threshold value CV3 for the sensing signals, the touch discrimination model may be learned to discriminate that the touch situation is the normal touch situation for the sensing signals. For example, as shown in FIG. 6B, the touch discrimination model may be learned to discriminate that the touch situation is the normal touch situation for at least some of the sensing signals sensed when there is a touch with a plurality of fingers.

On the other hand, when it is classified that the area of the touch region is smaller than the threshold area CA, the intensity of the touch sensitivity is smaller than the first threshold value CV1, and the touch uniformity is smaller than the third threshold value CV3 for the sensing signals, the touch discrimination model may be learned to discriminate that the touch situation is the abnormal touch situation for the sensing signals. For example, as shown in FIG. 7A, the touch discrimination model may be learned to discriminate that the touch situation is the abnormal touch situation for the sensing signals sensed by a cable. Further, as shown in FIG. 7B, the touch discrimination model may be learned to discriminate that the touch situation is the abnormal touch situation for the sensing signals sensed by water.

When it is classified that the area of the touch region is greater than the threshold area CA, the intensity of the touch sensitivity is smaller than the second threshold value CV2, and the touch uniformity is greater than the fourth threshold value CV4 for the sensing signals, the touch discrimination model may be learned to discriminate that the touch situation is the normal touch situation for the sensing signals. For example, as shown in FIG. 6B, the touch discrimination model may be learned to discriminate that the touch situation is the normal touch situation for at least some of the sensing signals sensed when there is a touch with a plurality of fingers.

On the other hand, when it is classified that the area of the touch region is greater than the threshold area CA, the intensity of the touch sensitivity is smaller than the second threshold value CV2, and the touch uniformity is smaller than the fourth threshold value CV4 for the sensing signals, the touch discrimination model may be learned to discriminate that the touch situation is the abnormal touch situation for the sensing signals. For example, as shown in FIG. 7C, the touch discrimination model may be learned to discriminate that the touch situation is the abnormal touch situation for the sensing signals sensed by a coin.

Further, the driving mode determination unit 211 may determine that the first driver 220 and the second driver 230 are driven in a first self-sensing mode (SSM1) or a second self-sensing mode (SSM2) according to the discriminated touch situation. Specifically, the driving mode determination unit 211 may determine that the first driver 220 and the second driver 230 are driven in the first self-sensing mode (SSM1) when the touch situation is discriminated as the normal touch situation, and may determine that the first driver 220 and the second driver 230 are driven in the second self-sensing mode (SSM2) when the touch situation is discriminated as the abnormal touch situation. Accordingly, a case in which a touch caused by a cause not intended by the user such as water or a coin is input as a normal touch may be prevented, and a normal touch caused by the user may be more accurately input.

In the normal touch situation, the first self-sensing signal RXS_S1 input according to the first self-sensing mode (SSM1) may have improved touch input accuracy when noise due to a retransmission signal in a low ground mass (LGM) state is minimized. On the other hand, touch input accuracy of the second self-sensing signal RXS_S2 may be lowered due to noise by the retransmission signal in the low ground mass (LGM) state. In the case of the abnormal touch situation by water, the first self-sensing signal RXS_S1 input according to the first self-sensing mode (SSM1) includes a sensing signal corresponding to an untouched region, and thus may have lowered touch input accuracy. On the other hand, the second self-sensing signal RXS_S2 input according to the second self-sensing mode (SSM2) does not include a sensing signal corresponding to the abnormal touch by water, and thus may have improved touch input accuracy. Accordingly, the driving mode determination unit 211 according to one embodiment of the present disclosure may improve the touch input accuracy according to the touch situation by driving the first driver 220 and the second driver 230 in the first self-sensing mode (SSM1) when the touch situation is the normal touch situation, and driving the first driver 220 and the second driver 230 in the second self-sensing mode (SSM2) when the touch situation is the abnormal touch situation.

Referring to FIG. 4 again, the touch coordinate calculation unit 212 receives self-sensing signals RXS_S including the first self-sensing signals RXS_S1 and and the second self-sensing signals RXS_S2, and the mutual sensing signals RXS_M from the first driver 220 and the second driver 230, and generates touch coordinates based on at least one among the received mutual sensing signals RXS_M, first self-sensing signals RXS_S1, and second self-sensing signals RXS_S2.

When the touch situation is discriminated as the normal touch situation, the touch coordinate calculation unit 212 calculates touch coordinates based on at least one among the mutual sensing signals RXS_M and the first self-sensing signals RXS_S1 by receiving the first self-sensing signals RXS_S1 driven and input in the first self-sensing mode (SSM1) through the first driver 220 and the second driver 230. Further, when the touch situation is discriminated as the abnormal touch situation, the touch coordinate calculation unit 212 calculates touch coordinates based on at least one among the mutual sensing signals RXS_M and the second self-sensing signals RXS_S2 by receiving the second self-sensing signals RXS_S2 driven and input in the second self-sensing mode (SSM2) through the first driver 220 and the second driver 230

The touch controller 213 may generate timing control signals for controlling driving and sensing timings of the first driver 220 and the second driver 230.

The first driver 220 supplies the touch driving signals TXS to the touch driving electrodes TXE in the mutual sensing mode (MSM), and supplies the touch driving signals TXS to the touch driving electrodes TXE in the first self-sensing mode (SSM1) and the second self-sensing mode (SSM2) to receive the self-sensing signal RXS_S for the supplied touch driving signals TXS. The first driver 220 includes channels connected to each of the touch driving electrodes TXE. That is, the touch driving signal TXS is transmitted to the touch driving electrode TXE through each channel, and the self-sensing signal RXS_S is received from the touch driving electrode TXE through each channel.

In the first self-sensing mode (SSM1), the first driver 220 supplies the touch driving signals TXS having different polarities to the touch driving electrodes TXE adjacent to each other at the same timing. Specifically, the first driver 220 supplies a first driving signal TXS1 to odd-numbered touch driving electrodes TXE(2n−1) (n is an integer)

through channels connected to each of the odd-numbered touch driving electrodes TXE(2n−1), and supplies a second driving signal TXS2 to even-numbered touch driving electrodes TXE(2n) through channels connected to each of the even-numbered touch driving electrodes TXE(2n) during a first frame 1Frame and a second frame 2Frame. In this case, the first driving signal TXS1 and the second driving signal TXS2 may have opposite polarities. That is, the first driving signal TXS1 and the second driving signal TXS2 may have the same amplitude and period, and may have a phase difference of 180 degrees. For example, in the first self-sensing mode (SSM1), the first driver 220 outputs the first driving signal TXS1 having a positive (P) polarity to a first touch driving electrode TXE1 and a third touch driving electrode TXE3 through the channels connected to each of the touch driving electrodes during the first frame 1Frame and the second frame 2Frame, and outputs the second driving signal TXS2 having a negative (N) polarity to a second touch driving electrode TXE2 and a fourth touch driving electrode TXE4 through the channels connected to each of the touch driving electrodes during the first frame 1Frame and the second frame 2Frame.

According to one embodiment of the present disclosure, in the second self-sensing mode (SSM2), the first driver 220 supplies the driving signals TXS to the touch driving electrodes TXE adjacent to each other at the different timings. Specifically, the first driver 220 supplies the first driving signal TXS1 to the odd-numbered touch driving electrodes TXE(2n−1) through the channels connected to each of the odd-numbered touch driving electrodes TXE(2n−1) during the first frame 1Frame, and supplies the second driving signal TXS2 to the even-numbered touch driving electrodes TXE(2n) through the channels connected to each of the even-numbered touch driving electrodes TXE(2n) during the second frame 2Frame. In this case, the first driving signal TXS1 and the second driving signal TXS2 may have opposite polarities. That is, the first driving signal TXS1 and the second driving signal TXS2 may have the same amplitude and period, and may have a phase difference of 180 degrees. For example, in the second self-sensing mode (SSM2), the first driver 220 outputs the first driving signal TXS1 having a positive (P) polarity to the first touch driving electrode TXE1 and the third touch driving electrode TXE3 through the channels connected to each of the touch driving electrodes during the first frame 1Frame, and outputs the second driving signal TXS2 having a negative (N) polarity to the second touch driving electrode TXE2 and the fourth touch driving electrode TXE4 through the channels connected to each of the touch driving electrodes during the second frame 2Frame. However, the present disclosure is not limited thereto, and in the second self-sensing mode (SSM2), the first driving signal TXS1 and the second driving signal TXS2 may have the same polarity and the same phase.

The second driver 230 receives the mutual sensing signal RXS_M generated for the touch driving signal TXS supplied to the touch driving electrodes TXE in the mutual sensing mode (MSM), and supplies the touch driving signals TXS to the touch sensing electrodes RXE in the first self-sensing mode (SSM1) and the second self-sensing mode (SSM2) to receive the self-sensing signal RXS_S for the supplied touch driving signals TXS. Although not shown in the drawings, the second driver 230 includes channels connected to each of the touch sensing electrodes RXE. That is, the touch driving signal TXS is transmitted to the touch driving electrode TXE through each channel, and the mutual sensing signal RXS_M and the self-sensing signal RXS_S are received from the touch sensing electrode RXE through each channel.

According to one embodiment of the present disclosure, as shown in FIG. 8, in the first self-sensing mode (SSM1), the second driver 230 supplies the touch driving signals TXS having different polarities to the touch sensing electrodes RXE adjacent to each other at the same timing. Specifically, the second driver 230 supplies the first driving signal TXS1 to odd-numbered touch sensing electrodes RXE(2n−1) through channels connected to each of the odd-numbered touch sensing electrodes RXE(2n−1), and supplies the second driving signal TXS2 to even-numbered touch sensing electrodes RXE(2n) through channels connected to each of the even-numbered touch sensing electrodes RXE(2n) during the first frame 1Frame and the second frame 2Frame. In this case, the first driving signal TXS1 and the second driving signal TXS2 may have opposite polarities. That is, the first driving signal TXS1 and the second driving signal TXS2 may have the same amplitude and period, and may have a phase difference of 180 degrees. For example, as shown in FIG. 8, in the first self-sensing mode (SSM1), the second driver 230 outputs the first driving signal TXS1 having a positive (P) polarity to a first touch sensing electrode RXE1 and a third touch sensing electrode RXE3 through a first channel CH1 and a third channel CH3 respectively connected to the first and third touch sensing electrodes RXE1 and RXE3 during the first frame 1Frame and the second frame 2Frame, and outputs the second driving signal TXS2 having a negative (N) polarity to a second touch sensing electrode RXE2 and a fourth touch sensing electrode RXE4 through a second channel CH2 and a fourth channel CH4 respectively connected to the second and fourth touch sensing electrodes RXE2 and RXE4 during the first frame 1Frame and the second frame 2Frame As shown in FIGS. 9A and 9B, in the second self-sensing mode (SSM2), the second driver 230 supplies the driving signals TXS to the touch sensing electrodes RXE adjacent to each other at the different timings. Specifically, the second driver 230 supplies the first driving signal TXS1 to the odd-numbered touch sensing electrodes RXE(2n−1) through the channels connected to each of the odd-numbered touch sensing electrodes RXE(2n−1) during the first frame 1Frame, and supplies the second driving signal TXS2 to the even-numbered touch sensing electrodes RXE(2n) through the channels connected to each of the even-numbered touch sensing electrodes RXE(2n) during the second frame 2Frame. In this case, as described above, the first driving signal TXS1 and the second driving signal TXS2 may have opposite polarities. That is, the first driving signal TXS1 and the second driving signal TXS2 may have the same amplitude and period, and may have a phase difference of 180 degrees. For example, as shown in FIGS. 9A and 9B, in the second self-sensing mode (SSM2), the second driver 230 outputs the first driving signal TXS1 having a positive (P) polarity to the first touch sensing electrode RXE1 and the third touch sensing electrode RXE3 through the first channel CH1 and the third channel CH3 respectively connected to the first and third touch sensing electrodes RXE1 and RXE3 during the first frame 1Frame, and outputs the second driving signal TXS2 having a negative (N) polarity to the second touch sensing electrode RXE2 and the fourth touch sensing electrode RXE4 through the second channel CH2 and the fourth channel CH4 respectively connected to the second and fourth touch sensing electrodes RXE2 and RXE4 during the second frame 2Frame. However, the present disclosure is not limited thereto, and in the second self-sensing mode (SSM2), the first driving signal TXS1 and the second driving signal TXS2 may have the same polarity and the same phase.

According to one embodiment of the present disclosure, in the first self-sensing mode (SSM1), when the first driver 220 and the second driver are driven and the driving signals having different polarities for the electrodes adjacent to each other are supplied to the touch screen panel TSP at the same timing, it is possible to minimize influence of the retransmission signal and improve the touch sensitivity in a low ground mass (LGM) state in which the touch screen panel (TSP) is not connected to the ground.

A touch sensing device according to the present disclosure can prevent a malfunction of a touch display device and the touch sensing device due to a touch input by a conductive material not intended by a user such as water or a coin.

The touch sensing device according to the present disclosure can be driven in different driving modes according to touch situations to more accurately receive a touch for each touch situation.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A touch sensing device configured to drive a plurality of touch sensors comprising a controller configured to calculate an area of a touch region, intensity of touch sensitivity, and uniformity of the touch sensitivity using sensing signals input from the plurality of touch sensors, and classify whether a touch situation is a normal touch situation or an abnormal touch situation based on at least one of the area of the touch region, the intensity of the touch sensitivity, and the uniformity of the touch sensitivity,
wherein the touch sensing device comprises a first driver and a second driver driven in at least one among a mutual sensing mode, a first self-sensing mode, and a second self-sensing mode,
wherein the controller is configured to classify whether the touch situation is the normal touch situation or the abnormal touch situation for the sensing signals based at least one of on the area of the touch region, the intensity of the touch sensitivity, and the uniformity of the touch sensitivity,
wherein the first driver and the second driver are driven in the first self-sensing mode to supply touch driving signals having different polarities to channels each connected to touch driving electrodes adjacent to each other or touch sensing electrodes adjacent to each other at the same timing when the controller discriminates the touch situations as the normal touch situation for the sensing signal, and
wherein the first driver and the second driver are driven in the second self-sensing mode to supply touch driving signals to channels each connected to touch driving electrodes adjacent to each other or touch sensing electrodes adjacent to each other at different timing when the controller discriminates the touch situations as the abnormal touch situation for the sensing signals.

2. The touch sensing device of claim 1, wherein the controller includes a decision tree learned to receive a plurality of sensing signals as learning data, and classify the plurality of sensing signals based on at least one of the area of the touch region, the intensity of the touch sensitivity, and the uniformity of the touch sensitivity.

3. The touch sensing device of claim 1, wherein the controller calculates a threshold area which becomes a reference of the area of the touch region, calculates a first threshold value and a second threshold value which become references of the intensity of the touch sensitivity, and calculates a third threshold value and a touch situation is the normal touch situation or the abnormal touch situation for the at least one among the mutual sensing signal, the first self-sensing signal, and the second self-sensing signal.

4. The touch sensing device of claim 1, further comprising the first driver and the second driver driven in at least one among the mutual sensing mode according to a mutual capacitance method and the first self-sensing mode or the second self-sensing mode according to a self-capacitance method,
wherein each of the sensing signals input from the plurality of touch sensors is at least one among a mutual sensing signal input according to the mutual sensing mode, a first self-sensing signal input according to the first self-sensing mode, and a second self-sensing signal input according to the second self-sensing mode, and
the controller discriminates a touch situation for at least one among the mutual sensing signal, the first self-sensing signal, and the second self-sensing signal.

5. The touch sensing device of claim 4, wherein:
the controller receives at least one among the mutual sensing signal, the first self-sensing signal, and the second self-sensing signal to discriminate whether the touch situation is the normal touch situation or the abnormal touch situation for the at least one among the mutual sensing signal, the first self-sensing signal, and the second self-sensing signal.

6. The touch sensing device of claim 4, wherein the controller drives the first driver and the second driver in the first self-sensing mode or the second self-sensing mode according to the discriminated touch situation.

7. A touch sensing device configured to drive a plurality of touch sensors comprising a controller that includes a decision tree learned to calculate an area of a touch region, intensity of touch sensitivity, and uniformity of the touch sensitivity using sensing signals input from the touch sensors, and classify whether a touch situation is a normal touch situation or an abnormal touch situation based on at least one of the area of the touch region, the intensity of the touch sensitivity, and the uniformity of the touch sensitivity, wherein at least one threshold value being a reference of the intensity of the touch sensitivity and the uniformity of the touch sensitivity changes based on a changeable threshold area's size, wherein the touch sensing device further comprises a first driver and a second driver driven in at least one among a mutual sensing mode, a first self-sensing mode, and a second self-sensing mode, wherein the first driver and the second driver are driven in the first self-sensing mode to supply touch driving signals having different polarities to channels each connected to touch driving electrodes adjacent to each other or touch sensing electrodes adjacent to each other at the same timing when the controller discriminates the touch situations as the normal touch situation for the sensing signals, and wherein the first driver and the second driver are driven in the second self-sensing mode to supply touch driving signals to channel each connected to touch driving electrodes adjacent to each other or touch sensing electrodes adjacent to each other at different timings when the controller discriminates the touch situations as the abnormal touch situation for the sensing signals.

8. The touch sensing device of claim 7, wherein the controller calculates a threshold area which becomes a reference of the area of the touch region, calculates a first threshold value and a second threshold value which become references of the intensity of the touch sensitivity, and calculates a third threshold value and a fourth threshold value which become references of the uniformity of the touch sensitivity through learning.

9. The touch sensing device of claim 7, wherein the sensing signal input from the touch sensor is a mutual sensing signal input according to the mutual sensing mode, a first self-sensing signal input according to the first self-sensing mode, or a second self-sensing signal input according to the second self-sensing mode, and the controller discriminates whether the touch situation is the normal touch situation or the abnormal touch situation for at least one among the mutual sensing signal, the first self-sensing signal, and the second self-sensing signal.

10. The touch sensing device of claim 9, wherein the controller drives the first driver and the second driver in the first self-sensing mode or the second self-sensing mode according to the discriminated touch situation.

* * * * *